Aug. 13, 1963 M. J. NOREGAARD 3,100,389

SECURITY BOOTH

Filed June 30, 1960 9 Sheets-Sheet 1

Maurice J. Noregaard
INVENTOR.

BY Eugene D. Farley
Atty.

Maurice J. Noregaard
INVENTOR.

BY Eugene D. Farley
Atty.

Maurice J. Noregaard
INVENTOR.

BY Eugene D. Farley
Atty.

Maurice J. Noregaard
INVENTOR.

BY Eugene D. Farley
Atty.

Maurice J. Noregaard
INVENTOR.

BY Eugene L. Farley
Atty.

Aug. 13, 1963 M. J. NOREGAARD 3,100,389

SECURITY BOOTH

Filed June 30, 1960 9 Sheets-Sheet 6

Maurice J. Noregaard
INVENTOR.

BY Eugene D. Farley
Atty.

Maurice J. Noregaard
INVENTOR.

BY Eugene D. Farley
Atty.

Maurice J. Noregaard
INVENTOR.

BY Eugene D. Farley
Atty.

Maurice J. Noregaard
INVENTOR.

BY Eugene P. Farley
Atty.

3,100,389
Patented Aug. 13, 1963

3,100,389

SECURITY BOOTH

Maurice J. Noregaard, Los Angeles, Calif., assignor to Card Key System, Inc., Burbank, Calif., a corporation of California Filed June 30, 1960, Ser. No. 39,931
17 Claims. (Cl. 70—278)

This invention relates to a security booth for guarding the entrance to security areas.

The primary objectives of the present invention are to provide a security booth which affords the following advantages:

The security booth is completely electro-mechanical, thus replacing human guards and overcoming the many disadvantages inherent with the latter, namely it is not subject to human error, it is completely impartial; it either relieves guards for other security duties, or it eliminates the cost of guards and the problems attending use of guards, for example revisions of guard schedules due to sickness or accident; and it is operable continuously through working and non-working hours.

The security booth is portable for easy transfer and installation at various locations with speed and facility.

The security booth is provided with a vast number of coding combinations, thus affording frequent change for maximum security.

The security booth is completely pick proof; the selected coding combination permits no experimentation or trial and error procedures, and the commitment of any error in the coding sequence functions automatically to lock the booth against entrance to the security area.

The security booth is versatile in use, affording visible inspection and control simultaneously with or independently of the requirement to complete a designated coding combination, and it may be adjusted to afford rapid exit during shift changes.

The security booth is highly efficient in its use, providing an absolute point of no entry to unauthorized personnel; it is completely safe for personnel by permitting free exit from the booth to the unrestricted area; and it provides long and faithful operation with minimum maintenance and repair.

The foregoing and other objects of this invention will appear from the following detailed description, taken in connection with the accompanying drawings, in which.

Figure 2:
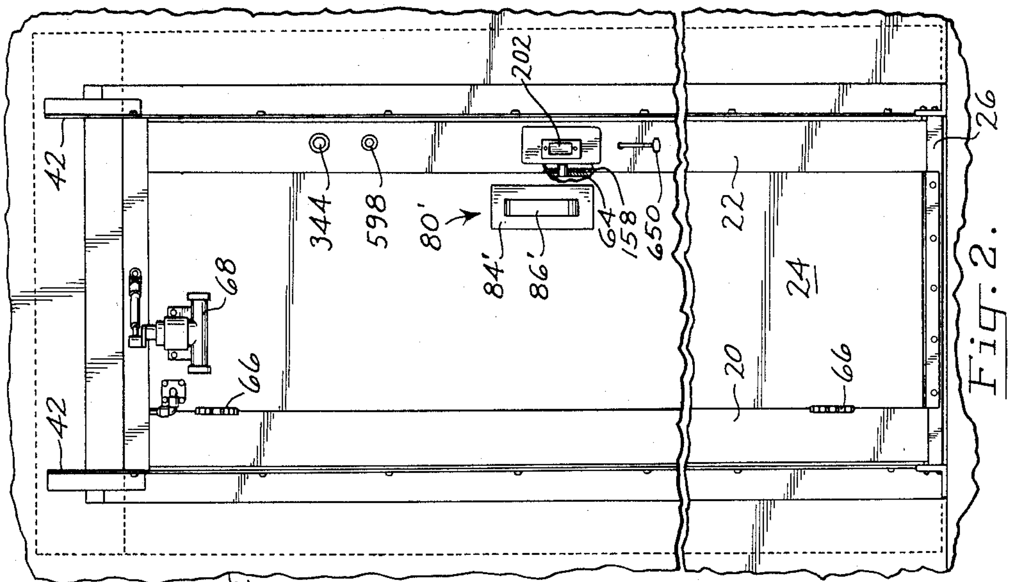
FIG. 2 is a fragmentary foreshortened elevation similar to FIG. 1 but viewed from the restricted side of the confining wall structure.

Referring principally to FIGS. 1–4, the security booth includes a vertically elongated housing having side walls 10 and 12 (FIG. 18), laterally spaced entrance wall sections 14, 16 defining between them an opening for the entrance door 18, and laterally spaced exit wall sections 20, 22 defining between them an opening for the exit door 24. The walls are supported upon a floor structure which includes the rectangular base frame 26. In turn, the walls support at their upper end a roof structure (FIG. 16) which includes a rectangular sheet of screen 28 or other perforate material supported by the hollow peripheral eaveforming frame 30.

Figures 1, 3:
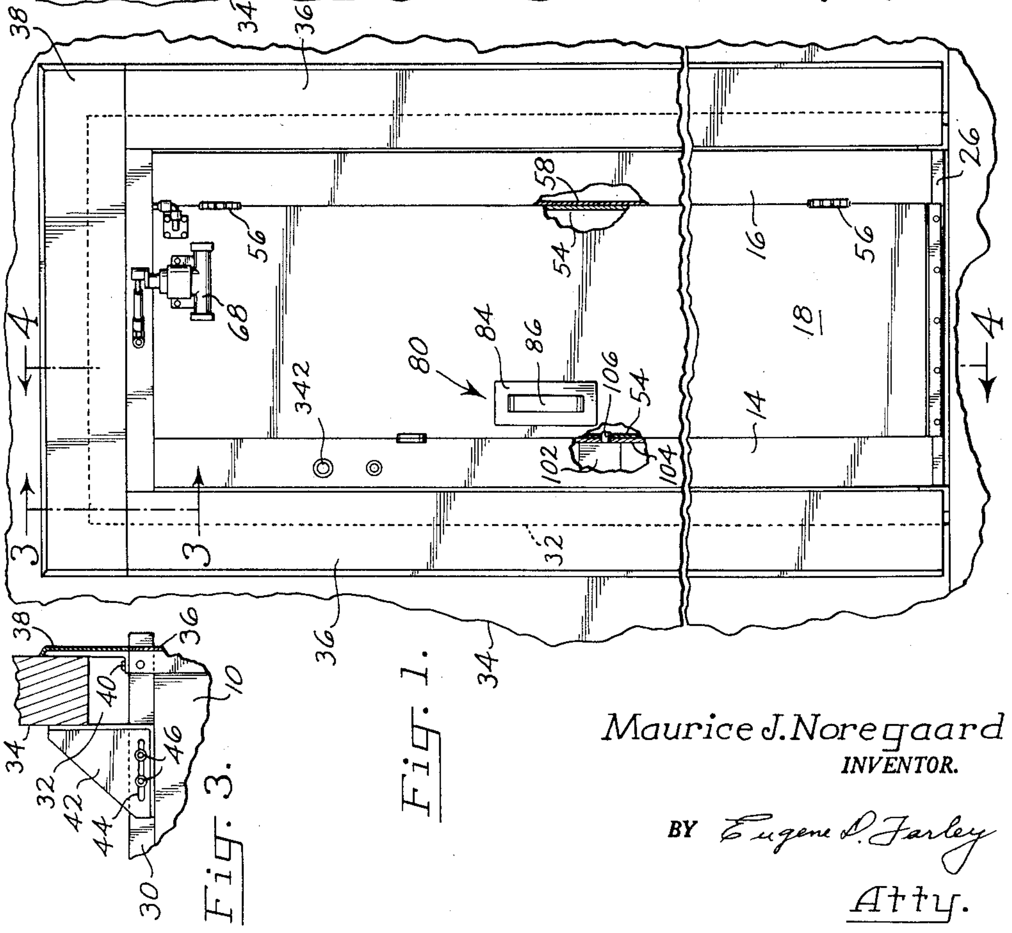
FIG. 1 is a foreshortened fragmentary front elevation of a security booth embodying the features of the present invention, the same being shown mounted in a wall structure defining a security area, and viewed from the unrestricted side of the wall.
FIG. 3 is a fragmentary sectional view taken along the line 3—3 in FIG. 1 and illustrating the manner of mounting the security booth in an opening in a wall structure.

The foregoing basic housing shell may be installed in a doorway 32 of a building or other confining wall or fence structure. A preferred form of detachable mounting is illustrated in FIGS. 1 and 3, wherein the housing shell is placed within the opening of a confining wall 34, with the entrance wall sections 14, 16 substantially flush with the corresponding outer surface of the wall. An exterior flash moulding is provided by the side moulding strips 36 and the top moulding strip 38, each of which is provided with a flange 40 on its inward side for attachment to the housing. Adjustable clamp brackets 42 are provided with horizontally elongated slots 44 through which to receive the securing screws 46 which are received in tapped openings in the opposite side portions of the hollow frame 30, the brackets projecting upwardly for abutment against the inner surface of the confining wall 34.

Figures 4, 5, 6, 7, 8:
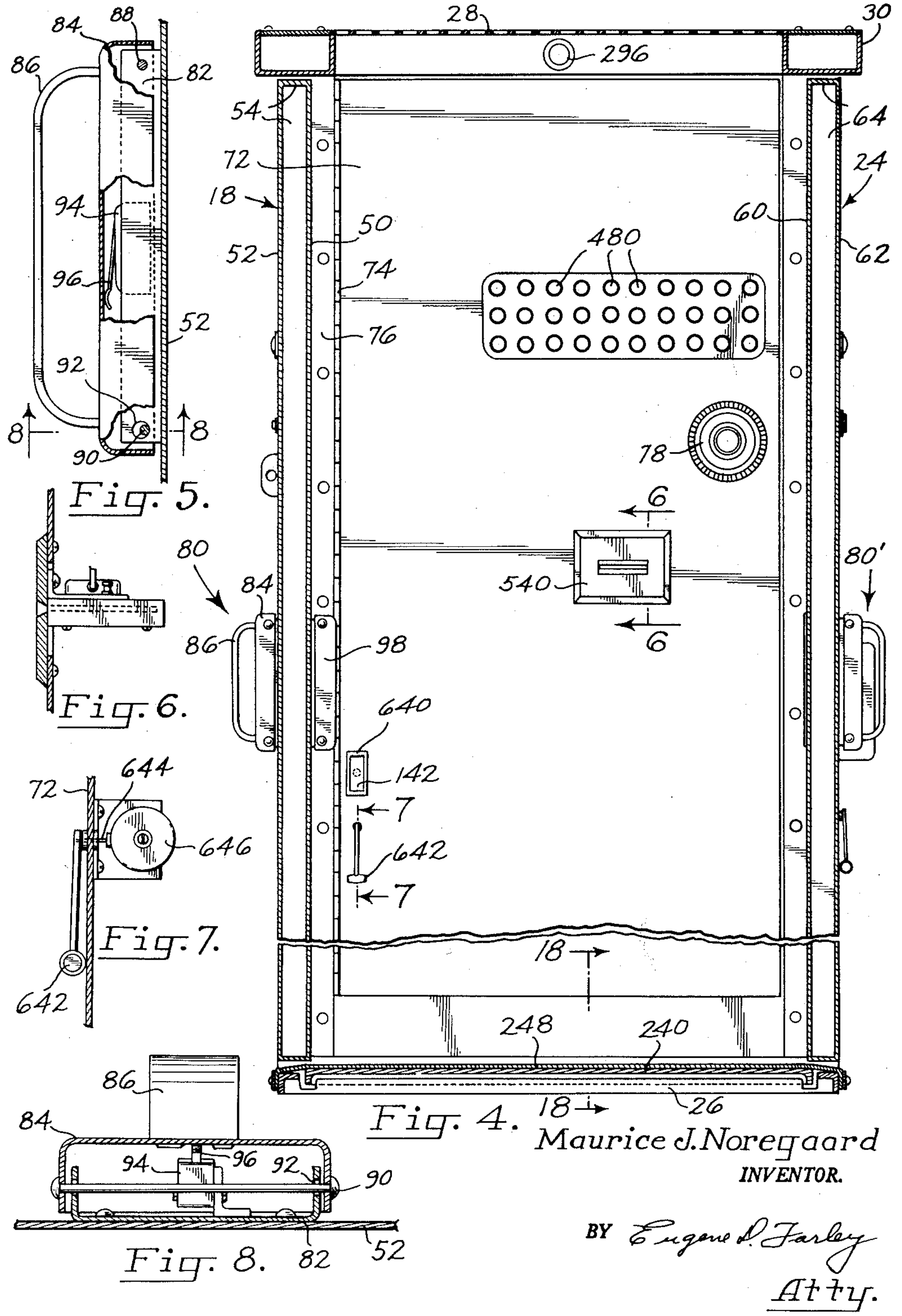
FIG. 4 is a foreshortened sectional view taken along the line 4—4 in FIG. 1.
FIG. 5 is a fragmentary view showing the door pull for the entrance door, parts thereof being broken away to disclose details of internal construction.
FIG. 6 is a fragmentary sectional view taken along the line 6—6 in FIG. 4 and showing general details of construction of the card-key switch assembly.
FIG. 7 is a fragmentary sectional view taken along the line 7—7 in FIG. 4 and showing structural details of the mechanism providing for emergency exit from the booth.
FIG. 8 is a fragmentary sectional view taken along the line 8—8 in FIG. 5.

As best shown in FIG. 4, the entrance door 18 preferably is constructed of metal formed to provide a hollow door construction having inner and outer face plates 50, 52 interconnected by a peripheral wall 54 forming the edges of the door. The entrance door is supported on the entrance wall section 16 by means of the hinges 56. One leaf of each hinge is secured to the inturned flange 58 of the wall section and the other leaf of each hinge is secured to the adjacent side edge 54 of the door.

In similar manner, the exit door is provided with inner and outer face plates 60, 62 interconnected by the peripheral wall 64, and is supported upon the exit wall section 20 by the hinges 66.

As illustrated in FIGS. 1 and 2, the entrance and exit doors are provided with conventional closures 68 which function to return the doors to closed position after opening.

Figure 19:
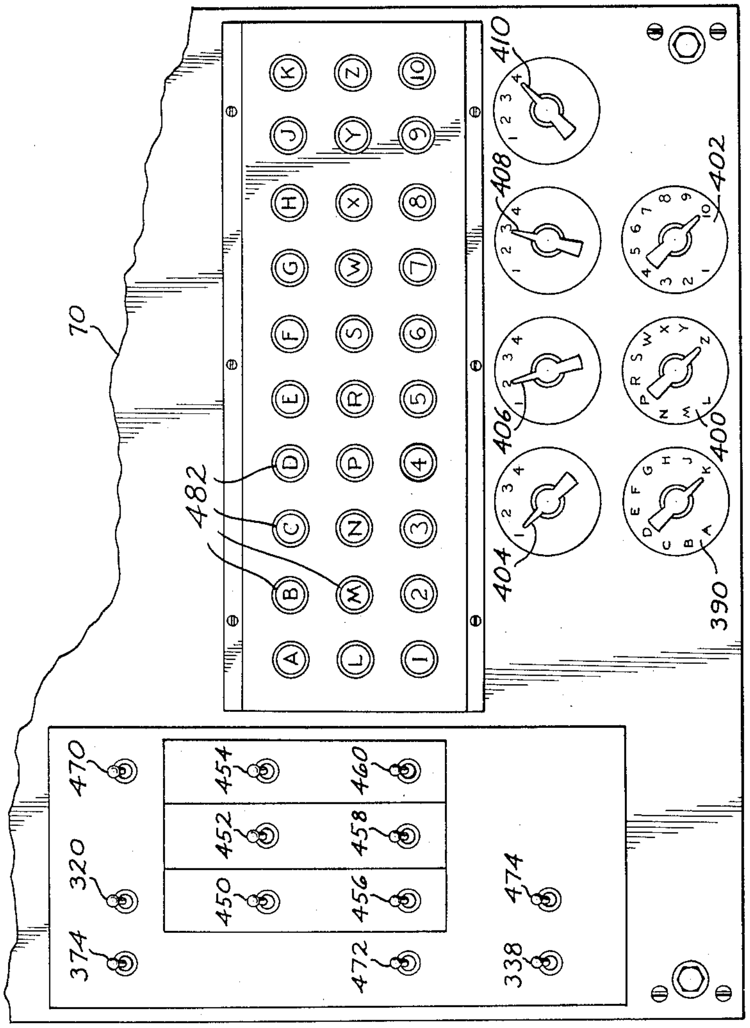
FIG. 19 is a fragmentary front elevation of the control panel by which to establish a desired code combination.

Mounted upon the inside of the side wall 10 is a control panel 70 (FIG. 19) which supports the electrical switch assemblies, described hereinafter, by which desired coding combinations are selected. This control panel is concealed behind an operating panel 72 which is supported by the piano hinge 74 secured to the flange 76 of the front wall section 14. The operating panel is locked by a latch mechanism which includes the combination lock 78. The operating panel supports the plurality of electrical push buttons and the electrical card-key switch for selecting the proper code combination as described in detail hereinafter.

Access to the booth from the entrance side is gained by pulling upon a door pull 80. As best shown in FIG. 5, this door pull includes a rectangular housing 82 secured to the front face 52 of the entrance door and covered by the overlying cap 84 which supports the door handle 86. The cap is pivotally secured adjacent one end to the door pull housing by means of the pivot pin 88, and the degree of pivot is restricted by means of the pin 90 mounted adjacent the opposite end of the cap and extending through an enlarged opening 92 in the housing.

Mounted within the housing 82 is an electrical microswitch 94, the actuating arm 96 of which engages the cap 84. Thus, as the handle is pulled outwardly, the cap is pivoted in the counterclockwise direction to the limit permitted by the enlarged opening 94, moving the microswitch to its closed position, for purposes described more fully hereinafter.

A door pusher assembly also is mounted upon the entrance door, but on the inner face plate 50 thereof, for the purpose of opening the entrance door from the inside of the booth. This pusher assembly is similar to the door pull assembly described hereinafter, with the exception that the cap 98 is not provided with a handle. However, the cap is pivoted in similar manner to effect closure of a microswitch 100 (FIG. 20) as the cap is pushed toward the door.

Figures 9, 10, 11:
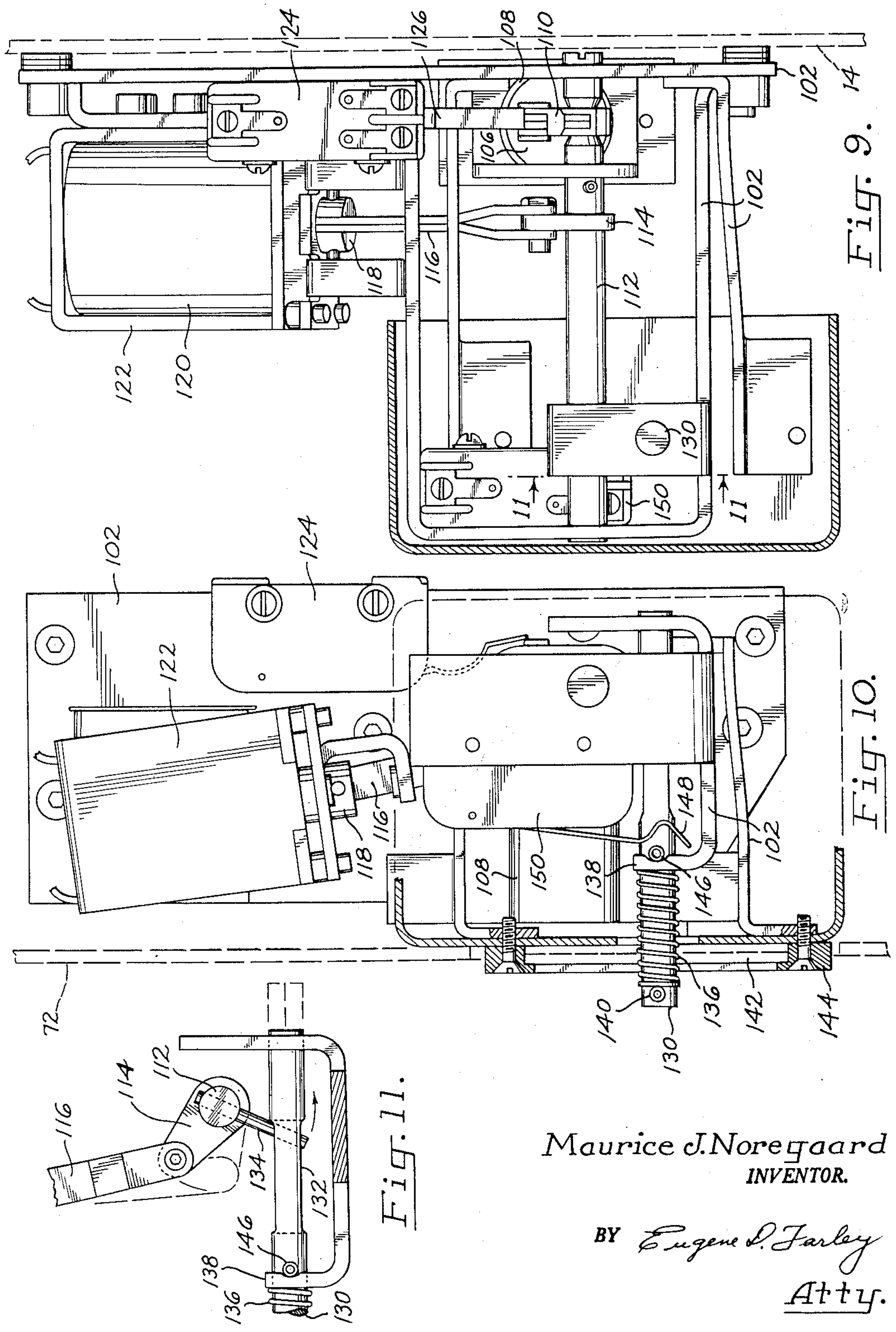
FIG. 9 is a rear elevation of an electrically actuated door latch construction associated with the entrance door shown in FIG. 1, a portion thereof being broken away to disclose details of internal construction, the parts being shown in the position of emergency release.
FIG. 10 is a vertical elevation of the door latch shown in FIG. 9 as viewed from the left side thereof.
FIG. 11 is a fragmentary sectional view taken along the line 11—11 in FIG. 9, the parts being shown in latch-locking position by dash lines.
Figure 13:
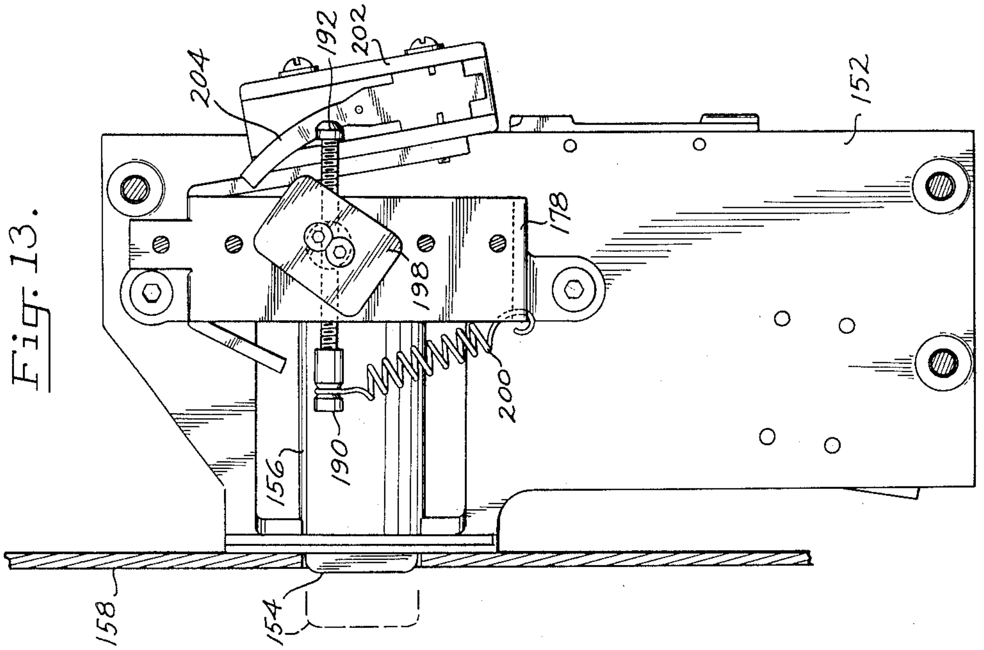
FIG. 13 is a front elevation similar to FIG. 12 but with the housing and emergency glass removed to disclose details of internal construction and to show the arrangement of parts in the position of emergency release.
Figure 12:
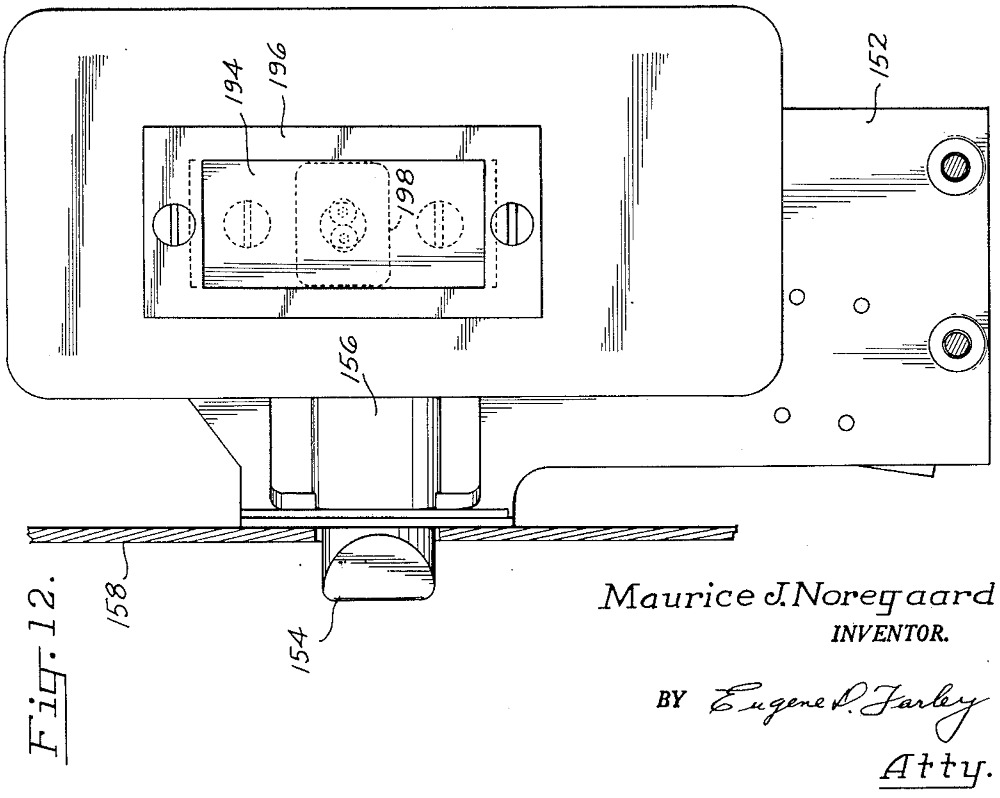
FIG. 12 is a front elevation of an electrically actuated door latch associated with the exit door shown in FIG. 2, the parts being shown in latch-locking position.

The entrance door is releasably locked by means of an electrically actuated door latch assembly shown in FIGS. 9–11. This assembly is supported upon a latch frame 102 which is secured to the entrance wall section 14. When the door is closed, registering openings in the inturned flange 104 (FIG. 1) of the entrance wall section and in the adjacent edge plate 54 of the door receive freely therethrough the reciprocating latch bolt 106 which is mounted slidably within the latch bolt cylinder 108 secured to the frame. The reciprocating latch bolt is connected pivotally to a lever 110 which is secured to a shaft 112 mounted in the frame for oscillatory rotation. A second lever 114 secured to the shaft is pivotally connected to the extension 116 of the reciprocating armature 118 of an electrically actuated solenoid 120, the frame housing 122 of which is secured to the frame 102. This solenoid functions upon activation to retract its armature and thus pivot the shaft 112 in the direction to retract the latch bolt from the opening in the adjacent edge plate 54 of the entrance door. The latch bolt assembly is spring loaded internally in the direction to extend the latch bolt when the solenoid is deactivated.

An electric microswitch 124 is mounted upon the latch frame, and its actuating arm 126 engages the latch bolt lever 110 for actuation by the latter as the latch bolt is extended and retracted, as explained more fully hereinafter.

Emergency latch release means is provided to permit opening of the entrance door from the inside of the booth. Referring particularly to FIGS. 10 and 11, a plunger rod 130 is mounted on the latch frame for longitudinal reciprocation on an axis substantially normal to the axis of the shaft 112. An elongated slot 132 is provided in the plunger to freely receive the pin 134 projecting from the shaft 112. A coil spring 136 encircles the outer portion of the plunger, between the latch frame abutment 138 and the transverse pin 140, normally urging the plunger outward toward the left (FIG. 10). However, the plunger normally is retained in the retracted position illustrated, against the tension of the coil spring 136, by means of the emergency glass 142 which is confined within the removable housing 144. Thus, breakage of the glass removes the abutment for the plunger, whereupon the tension of the coil spring 136 urges the plunger to its leftward position of outward extension, this position being determined by abutment of the transverse pin 146 against the frame section 138.

When the plunger is confined behind the emergency glass, the slot 132 has been moved toward the right (FIG. 11) sufficiently to disengage from the pin 134, thus permitting the internal loading of the latch bolt assembly to extend the latch bolt to locking position. In this position of the plunger, the transverse pin 146 engages the actuating arm 148 of the microswitch 150 mounted on the latch frame, to maintain the microswitch closed.

When the emergency glass is broken and the plunger 130 permitted to move to its position of outward extension toward the left, the right hand edge of the slot 132 in the plunger engages the pin 134 and rotates the shaft 112 clockwise (FIG. 11). Since the force of the coil spring 136 is greater than the internal loading of the latch bolt, the latter is withdrawn from the entrance door, permitting the latter to be opened. However, in this position of the plunger, the microswitch arm 148 is released and the microswitch contacts closed to complete the electric circuit of an alarm, as explained more fully hereinafter.

The exit door 24 also is releasably locked in closed position by means of an electrically actuated latch assembly. In the embodiment illustrated in FIGS. 12–15, this latch assembly is supported upon a frame 152 which is secured to the exit wall section 22. A reciprocating latch bolt 154 is received slidably within the latch bolt housing 156 mounted on the frame, and the latch bolt is arranged to extend freely through registering openings in the inwardly directed flange 158 of the exit door wall section 22 and the adjacent edge plate 64 of the exit door.

The latch bolt is connected pivotally to a lever 160 secured to a shaft 162 mounted on the frame for oscillatory rotation. A second lever 164 secured to the shaft is connected pivotally to the extending arm 166 of the reciprocating armature 168 of the electrically actuated solenoid 170 whose frame 172 is supported by the latch frame 152. The internal spring loading of the latch bolt assembly normally urges the latch bolt to its locking position, at which the solenoid armature 168 is in retracted position. Thus, activation of the solenoid causes the armature to be drawn toward it (FIG. 14) rotating the shaft 162 clockwise and effecting retraction of the latch bolt.

An electrical microswitch 174 is mounted upon the frame 152 and its operating arm 176 engages the latch bolt lever 160 for operation by the latter as the latch bolt is reciprocated between locking and unlocking positions.

Figures 14, 15:
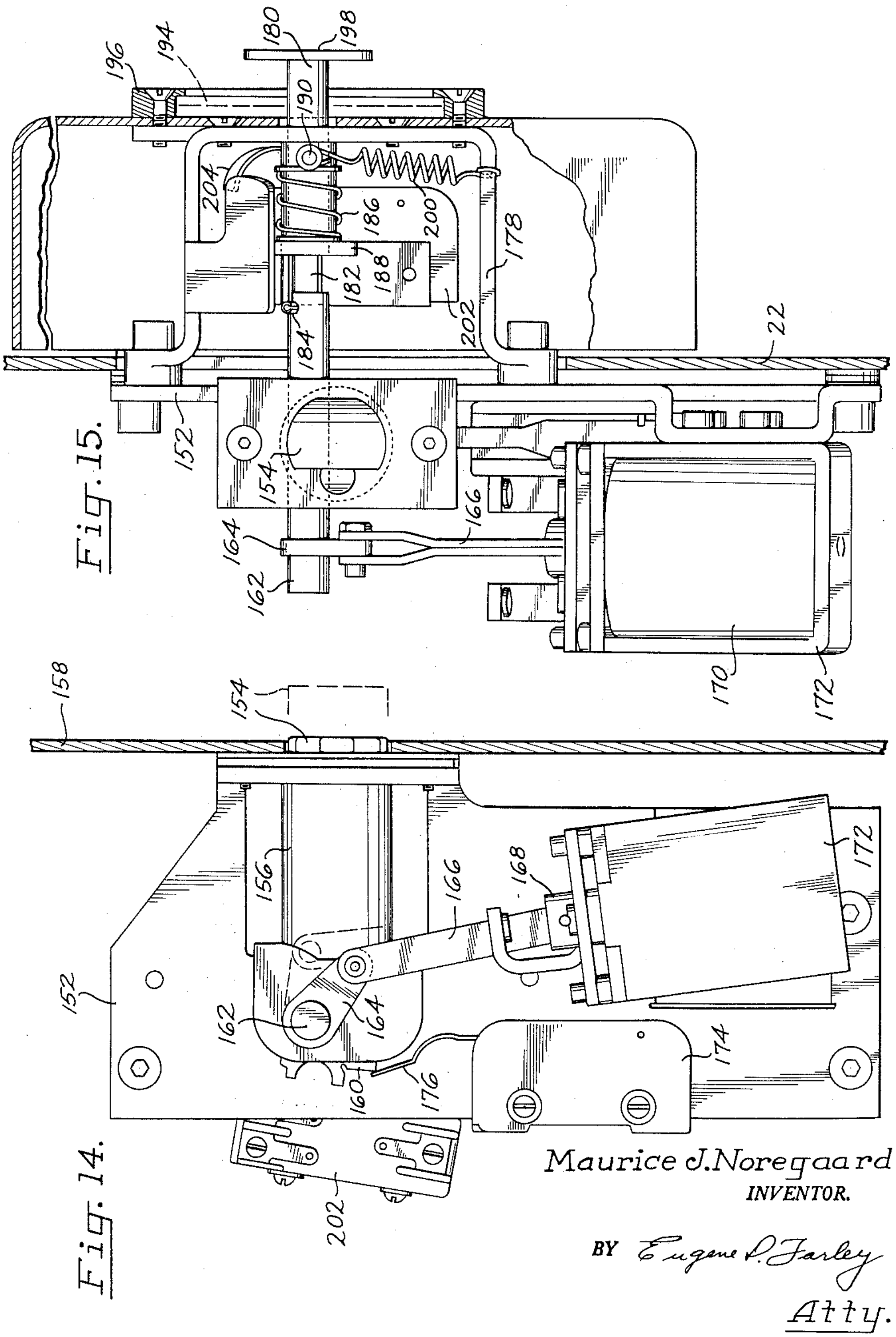
FIG. 14 is a rear elevation of the door latch shown in FIG. 13; parts thereof being shown in latch-locking position by dash lines.
FIG. 15 is a vertical elevation of the door latch as viewed from the right in FIG. 14.

Means also is provided for unlocking the exit door under emergency conditions. Referring particularly to FIG. 15, a sub-frame 178 is secured to the main frame 152 and projects outwardly therefrom. A plunger 180 extends freely through an opening in the sub-frame for longitudinal and rotational movement. The inner end of the plunger is provided with an arcuate cam segment 182 which overlaps the adjacent end of the shaft 162, and is arranged to intercept a radially projecting pin 184 secured to the shaft. A coil spring 186 encircles a portion of the plunger between a guide bearing 188 and a pair of axially aligned pins 190, 192 which project in diametrically opposite directions from the plunger. The plunger thus is urged resiliently outward toward the right in FIG. 15.

However, the plunger normally is restrained from this movement toward the right by means of the emergency glass 194 contained within the housing 196, the outer enlarged end 198 of the plunger abutting against the inner surface of the glass. This outer enlarged end of the plunger has a non-circular perimeter (FIG. 12) and opposite sides thereof are dimensioned to be confined within the side walls of the housing 196 when the plunger is rotated sufficiently to align said corresponding sides. This direction of rotation is resisted resiliently by means of the coil spring 200 which is attached at one end to the sub-frame 178 and at the opposite end to the projecting pin 190.

With the plunger confined behind the emergency glass, the cam section 182 disengages from the projecting pin 184 and thus permits the internal spring loading of the latch bolt to extend the latter to locking position. Also, in this position the solenoid 170 may be activated to retract the latch bolt. However, when the emergency glass is broken the coil spring 186 urges the plunger outwardly, and when the enlarged end 198 of the plunger disengages from the confining walls of the housing 196, the spring 200 urges the plunger to rotate counter-clockwise from the position shown in FIG. 12 to the position shown in FIG. 13. In this position the cam section 182 engages the pin 184 and rotates the shaft 162 in the direction to retract the latch bolt to its unlocked position, for emergency opening of the exit door.

Mounted upon the sub-frame 178 is an electrical microswich 202, the operating arm 204 of which is arranged to intercept the path of movement of the extending pin 192 as the latter is rotated with the plunger when the latter is released during emergency condition.

Figure 16:
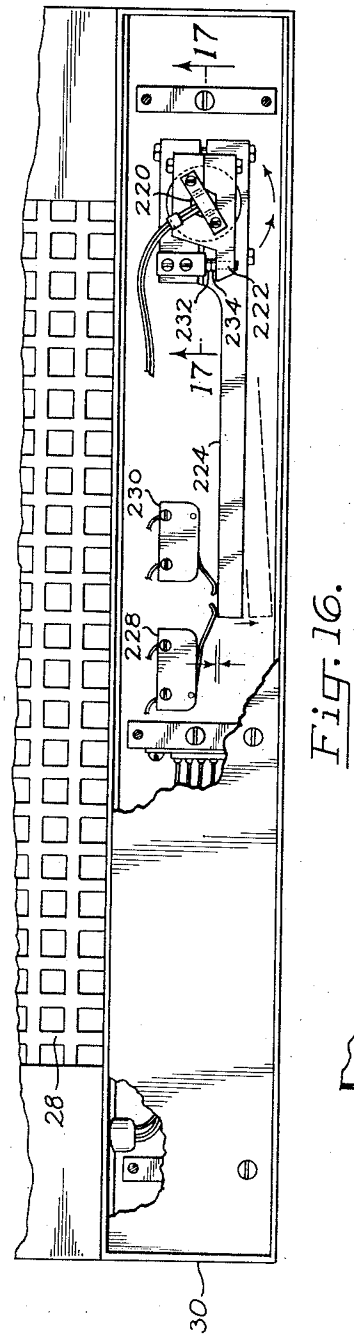
FIG. 16 is a fragmentary plan view of the top of the booth, parts thereof being broken away to disclose details of construction.
Figures 17, 18:
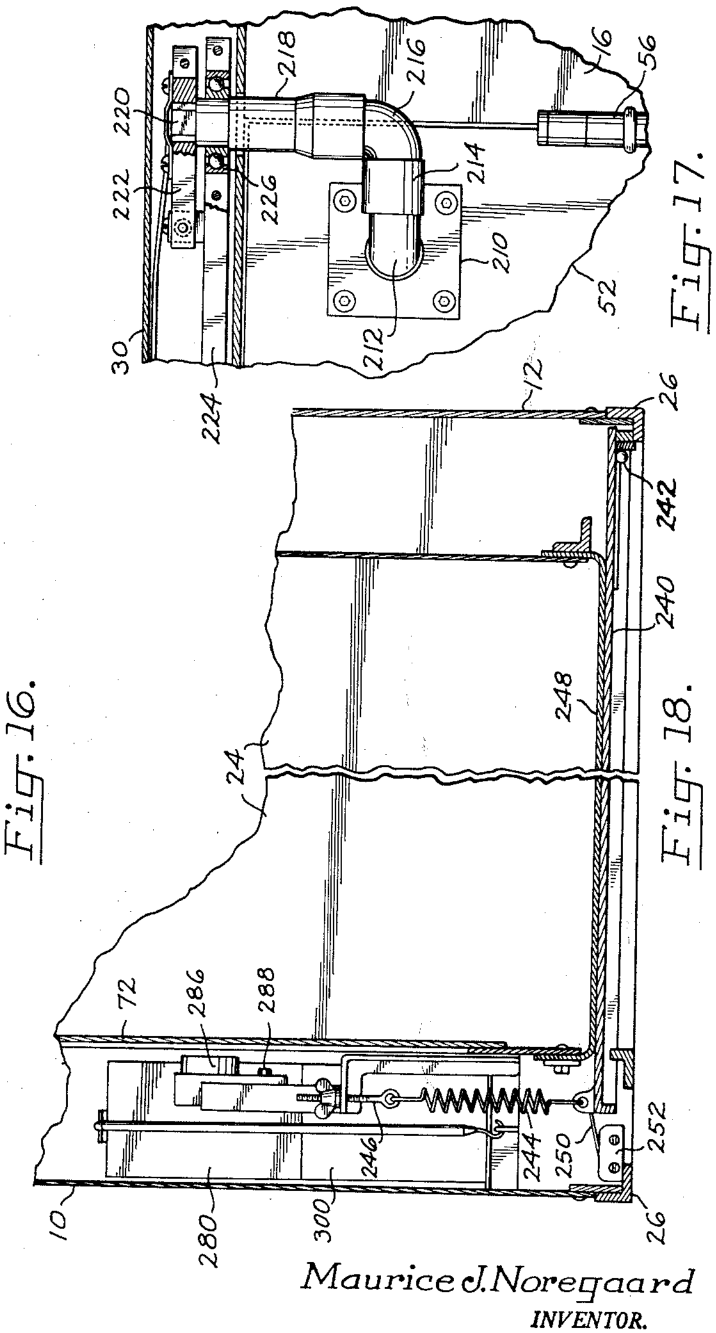
FIG. 17 is a fragmentary sectional view taken along the line 17—17 in FIG. 16.
FIG. 18 is a fragmentary foreshortened sectional view taken along the line 18—18 in FIG. 4.

Means also is provided for insuring against simultaneous opening of both entrance and exit doors, during security operation. Referring particularly to FIGS. 16 and 17 of the drawings, the assembly illustrated therein is associated with the entrance door, it being understood that a similar assembly also is associated with the exit door. On the outer face plate 52 of the entrance door there is secured a plate 210 supporting a hollow conduit elbow 212. A sleeve connector 214 interconnects this elbow and a second elbow 216, the outer end of which projects upwardly and is connected to a hollow shaft 218 which extends through an opening in the bottom plate of the hollow roof frame 30. The axis of this hollow shaft is arranged coaxially with the axes of the door hinges 56, to permit its rotation during opening and closing of the door.

The hollow elbows and shaft serve conveniently to receive the electric wires from the door pull switches 94 and 94*a*, for passage into the booth housing for connection to the associated relays described hereinafter.

The upper end 220 of the hollow shaft is provided with a hexagonal or other non-circular outer periphery, for mounting the arm 222 firmly thereon for rotation therewith. Immediately below this arm there is an elongated arm 224 which is journaled for rotation freely on the bearing 226 surrounding the hollow shaft. Positioned adjacent the outer end of the elongated arm 224 is a pair of electrical microswitches 228 and 230 spring-loaded, the actuating arms of which are arranged for engagement by the arm. One of these microswitches 228, hereinafter referred to as the "break-soon" switch, is actuated when the door is opened about 1/16" and the other microswitch 230, hereinafter referred to as the "break-late" switch, is actuated when the door is opened about ½", as explained more fully hereinafter.

An abutment member 232 is mounted upon the arm 224 and a corresponding abutment member 234 is mounted upon the upper arm 222 for engagement therewith.

Thus, as the entrance door begins to open, the hollow shaft 218 begins counter-clockwise rotation (FIG. 16), rotating with it the upper arm 222. Since this arm engages the underlying arm through the abutment members, release of this engagement permits the arm 224 to rotate counter-clockwise, under the influence of the spring loaded actuating arms of microswitches 228 and 230, until its outer end abuts the inner surface of the hollow roof frame. Thereafter, further opening of the entrance door causes the upper arm to continue its rotation.

Means also is provided for preventing the opening of either the entrance or exit door when a person is inside the booth. In the embodiment illustrated and best shown in FIG. 18, this means is provided by a floor plate 240 which is secured pivotally to the bottom frame 26 by means of the hinge 242. The opposite side of the floor plate is supported resiliently in an upward position by the coil spring 244 connected at its lower end to the floor plate and at its upper end to an adjustable eye bolt 246 mounted on a flange of the housing wall. A resilient floor covering 248, such as a rubber mat, overlies the floor plate 240.

When a person enters the booth, his weight overcomes the force of the spring 244 and causes the suspended end of the floor plate to depress. This end of the floor plate engages the arm 250 of a microswitch 252 and closes the latter. As explained more fully hereinafter, this switch is arranged in the control circuits of the latch bolt solenoids to render the latter inoperative when the booth is occupied.

The combination of the mechanical assembly described hereinbefore and the electrical components associated therewith now will be described in conjunction with the operation of the booth.

Figure 20:
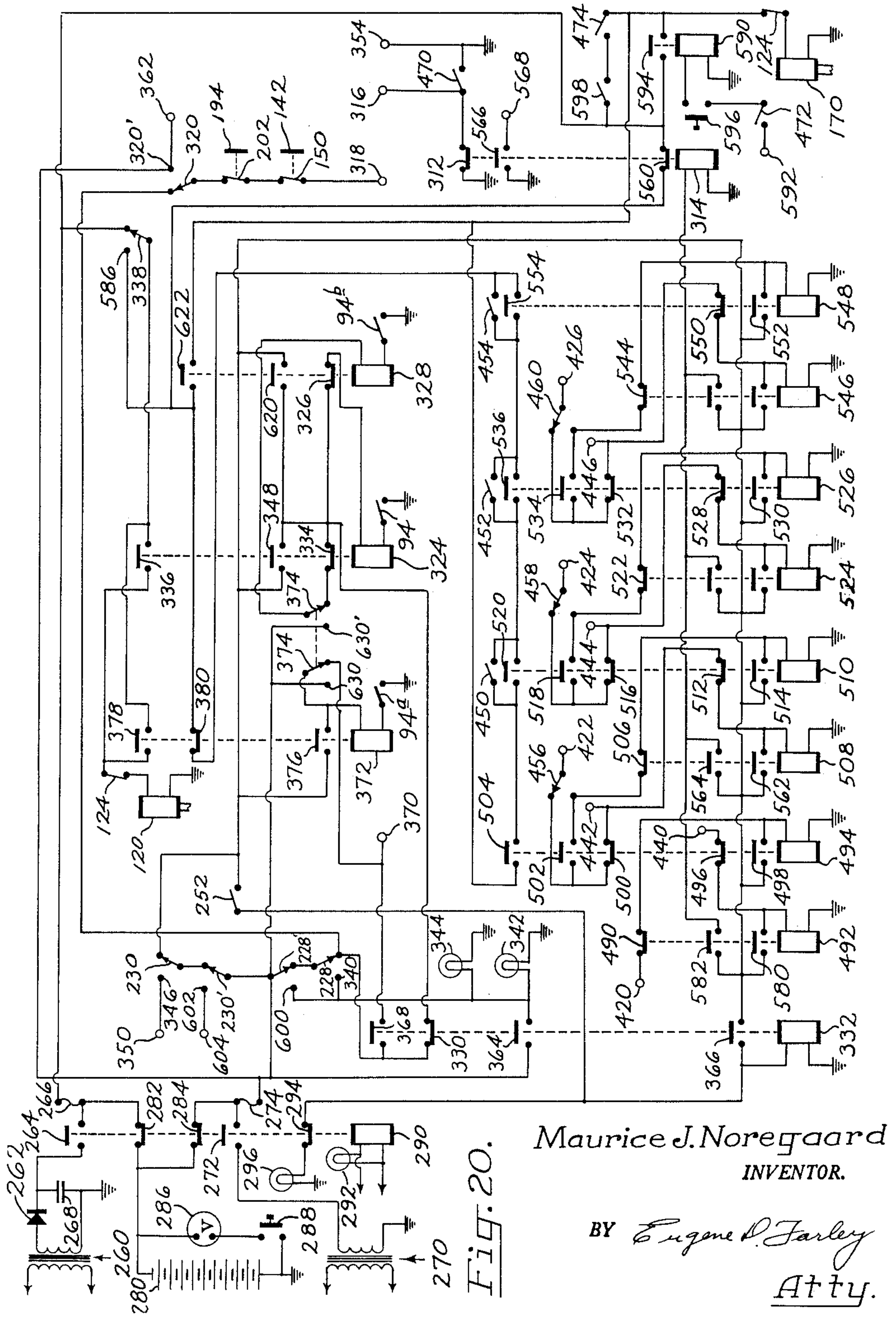
FIGS. 20, 21 and 22 are schematic diagrams of electrical circuitry for the security booth.

Electrical power for operating the components of the booth is supplied from a plurality of sources. Referring to FIG. 20 of the drawings, one of such sources is provided by a step-down transformer 260, the primary winding of which is connected to a conventional source of alternating current and the secondary of which is connected at one end to ground and at the other end to the series combination of the rectifier 262, the normally open switch contacts 264 and the fuse 268. The secondary winding and rectifier are shunted by condenser 268. A second source of electric potential is provided by the step-down transformer 270, the primary of which is connected to a conventional source of alternating current and the secondary of which is connected at one end to ground and at the opposite end to the series combination of the normally open contacts 272 and the fuse 274.

In the event of failure of the conventional alternating current supply, an emergency source of electric potential is provided by the battery 280, one end of which is connected to ground and the other end of which is connected through the normally closed contacts 282 and 284 to the fuses 266 and 274 respectively. The battery is shunted by the series arrangement of the voltmeter 286 and switch 288, by which to test the battery periodically and thus insure its proper operation.

The foregoing switch contacts are actuated by an electric relay 290 which is connected to a conventional source of alternating current. The relay is shunted by lamp 292 which is located in the booth behind the person as he faces the operating panel 72, to illuminate the latter. An additional set of normally closed contacts 294 are operated by the relay and are arranged in the battery circuit of a second lamp 296. This lamp is located in the booth above the operating panel and gives visible evidence that the source of alternating current is inoperative and that the battery has been switched in automatically. Since the electric circuit of this lamp includes the floor switch 252, the lamp is operative only when the booth is occupied.

Figure 22:
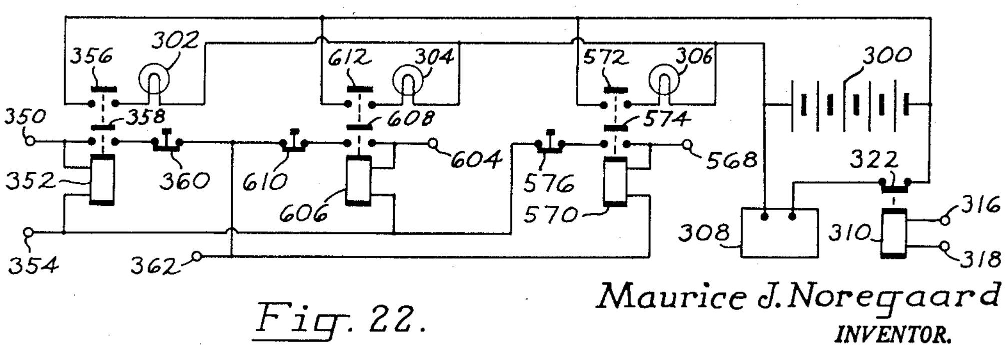

In FIG. 22 there is shown a battery 300 which provides a source of electric potential for the indicator lights 302, 304, 306 and the alarm device 308, which may be a bell, buzzer, light or other suitable device. These lights and alarm also are located at the remote guard station, for purposes described in detail hereinafter.

With the security booth properly installed in an opening in a confining wall 34, as described hereinbefore, and the transformers 260, 270 connected to a conventional source of alternating current, activation of the relay 290 effects transfer of the associated contacts to their alternate positions from those shown in FIG. 20. The electric circuit of the alarm relay 310 (FIG. 22) thus is completed from ground through the normally closed contacts 312 of relay 314 (FIG. 20), through the common connecting terminals 316 and the alarm relay 310, thence through the common connecting terminals 318 and the normally closed microswitches 150, 202 associated with the emergency glasses of the latch bolt assemblies of the entrance and exit doors, thence through the operative door alarm switch 320 located on the control panel 70, through the break-soon microswitches 228 and 228′ of the entrance and exit doors, and thence through the closed contacts 272 to the transformer secondary. Activation of the alarm relay 310 effects opening of the associated contacts 322 in the battery circuit of the alarm device 308, thus rendering the latter inoperative.

In the event it is desired to render the door alarm permanently inoperative, the door alarm switch 320 is moved to the alternate contact 320′ to bypass the break-soon microswitches. In this case the alarm device is operative only when one of the emergency door latch microswitches is opened upon breaking the emergency glass, or when the coding operating has not been done correctly, as explained more fully hereinafter.

When a person desires to gain entrance to the security area, he first pulls upon the entrance door handle 86. The initial pull effects movement of the cap 84 within the limits of the enlarged opening 92 surrounding the pin 90, thus effecting closure of the microswitch 94. Closing of this switch completes the electric circuit of the relay 324 through the normally closed contacts 326 of the inactivated relay 328, the normally closed contacts 330 of the inactivated relay 332, thence through the break-soon microswitches 228, 228′ and the closed contacts 272 of the activated relay 290 to the transformer secondary. Activation of the relay 324 opens the contacts 334 in the circuit of the relay 328 associated with the exit door 24, thereby preventing opening of the latter during opening of the entrance door.

Activation of the relay 324 also closes the contacts 336 to complete the electric circuit of the entrance door latch solenoid 120, through the switch 124 associated with the exit door and the entrance door lock switch 338, thence through the closed contacts 272 to the transformer secondary.

With the latch bolt retracted, upon activation of solenoid 120, the entrance door now may be opened. The first slight opening of the door, for example 1/16 inch, causes the break-soon microswitch 228 to shift to contact 340, thus breaking the circuit of the relay 328 associated with the exit door. This circuit could otherwise be completed by holding the door ajar and releasing the handle 86 to open the associated microswitch 94 and deenergize the relay 324.

As the break-soon microswitch engages the contact 340, the electric circuits of the indicator lights 342, 344 are completed through the closed contacts 272 to the transformer secondary. These indicator lights are located one adjacent each of the entrance and exit doors to indicate that the booth is being entered and is occupied.

Upon further slight opening of the entrance door, for example 1/2 inch, the break-late microswitch 230 is caused to shift to contact 346. Opening of the switch 230 breaks the auxiliary circuit of the relay 324 through the closed contacts 348, thus insuring against activation of the relay 328 associated with the exit door.

Upon shifting of the break-late microswitch to the contact 346, a circuit is completed from the transformer secondary through the closed contacts 272 and said contact 346, through the terminal connectors 350 and relay 352 (FIG. 22), and thence through the terminal connectors 354 to ground (FIG. 20). Activation of the relay 352 effects closure of the associated contacts 356 and completion of the electric circuit of the indicator lamp 302 which gives visible evidence that the entrance door has been opened. A holding circuit for this relay is completed by the associated contacts 358 and the normally closed reset push button 360, thence through the terminal connectors 362 and closed contacts 272 to the transformer secondary.

The entrance door is swung open to admit the person to the booth. As he steps upon the floor mat 248, his weight overcomes the resistance of the coil spring 244 and the floor plate 240 pivots to close the microswitch 252. When the entrance door has closed, by action of the door closure 68, the break-late and break-soon microswitches are returned to the positions indicated in FIG. 20.

Closure of the floor plate microswitch 252 completes the electric circuit of the relay 332 from ground through the break-late microswitches 230, 230′. Closure of the associated contacts 364 completes the electric circuits for the red indicator lamps 342 and 344, bypassing the break-soon microswitches 228, 228′ which now have returned to the positions indicated in FIG. 20 upon closing of the entrance door. Closure of the contacts 366 also completes an electric circuit for the associated relay 332 which bypasses the floor plate microswitch 252. Thus, a person in the booth cannot deactivate relay 332 by somehow removing his weight from the floor to open the switch 252. Activation of the relay 332 also effects opening of the associated contacts 330 in the electric circuits of the relays 324 and 328, to prevent the opening of either of the doors while the booth is occupied.

Figure 21:
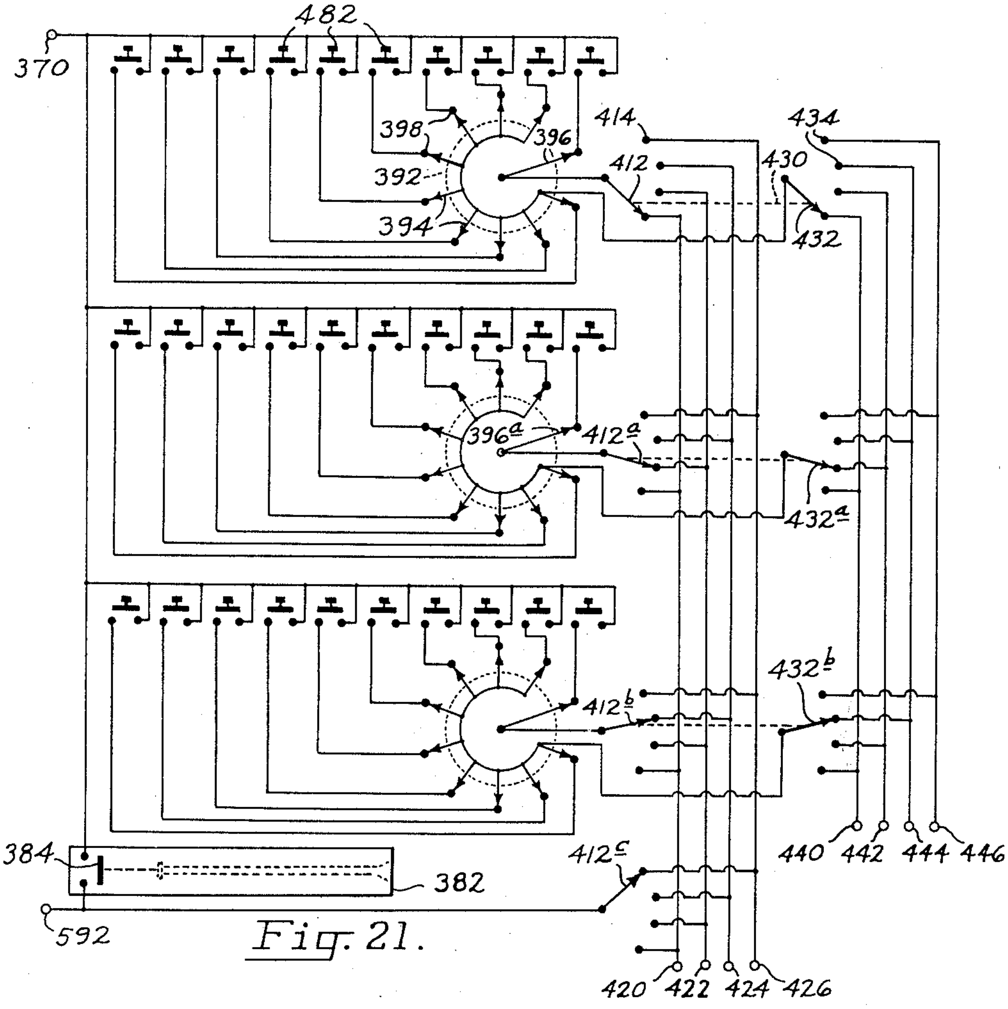

Activation of the relay 332 also effects closure of the associated contacts 368 to complete an electric circuit from the transformer secondary, through the closed contacts 272 of the energized relay 290, thence through the break-soon microswitches 228, 228′ and said closed contacts 368 through the terminal connectors 370 to the coding switches shown in FIG. 21.

If, at this point, the person wishes to leave the booth by way of the entrance door through which he entered, he may push upon the box cap 98 to effect closure of the microswitch 94*a* and thus complete the electric circuit of relay 372 through the normal inoperative position of the fast exit switch 374 and the closed contacts 368 of the activated relay 332 and the break-soon microswitches. Activation of the relay 372 causes closure of the associated contacts 376 which bypass the contacts 368 of relay 332 and the break-soon microswitches, completing the circuit through the break-late microswitches. Activation of this relay 372 also effects closure of the associated contacts 378 to energize the entrance door latch solenoid 120 to permit opening of the entrance door. Opening of the normally closed contacts 380 associated with the relay 372 breaks the circuit of the coding system, to render the latter inoperative while the entrance door is unlocked.

Assuming the person has remained in the booth and now wishes to manipulate the coding system to effect unlocking of the exit door 24, the preliminary selection of the code to be completed now will be described.

The guard or other person responsible for setting the code, manipulates the combination dial lock 78 on the operating panel 72 to unlock the latter. The panel is swung open on its hinge 74 to expose the control panel 70 behind it. Let it now be assumed that the selected code consists of the letters K and Z, the numeral 10 and the use of the card key switch 382. Assume further that this code combination is to be completed in the sequence indicated. Accordingly, the operator first rotates the dial pointer 390 to the letter K. Rotation of the pointer causes simultaneous rotation of a rotary switch member 392 on which is mounted the series connected contacts 394 and the electrically isolated contact 396. Each of the contacts 394, 396 engages a corresponding contact 398 on an associated fixed switch member, and each of these fixed contacts is connected to a different one of the push button switches 462 identified by the letters A–K, inclusive. It is the isolated contact 396 that engages the fixed contact connected electrically to the push button switch identified by the letter K.

In similar manner, the operator rotates the dial pointer 400 to the letter Z and the dial pointer 402 to the numeral 10, to complete that portion of the code including K–Z–10.

Since it is intended that the foregoing code is to be completed in the sequence indicated, the operator then rotates the sequence dial pointer 404 to the numeral 1, the sequence pointer 406 to the numeral 2, the sequence pointer 408 to the numeral 3. Moreover, since the card key switch 382 is to complete the coding sequence, the sequence pointer 410 is rotated to the numeral 4.

Each of the sequence switches includes a rotary section carrying a contact 412 connected electrically to the isolated contact 396 of its associated selector switch. Associated with the rotary section of the sequence switch is a fixed section carrying a plurality of contacts 414 arranged for selective engagement by the rotary contact. The corresponding fixed contacts are connected together electrically in series, and each series is provided with a terminal connector. Since, in the illustrated embodiment, there are four fixed contacts on each switch, there are four terminal connectors 420, 422, 424 and 426.

A second sequence switch is associated with each of the sequence switches, for the purpose of detecting whether or not the code combination has been completed properly. Each of these second sequence switches includes a rotary section ganged mechanically to the rotary section of its associated sequence switch, as indicated by the dash line 430. The rotary section carries a contact 432 connected electrically to the series connected contacts 394 of the associated selector switch. The rotary contact 432 is arranged for selective engagement with a plurality of spaced contacts 434 on a fixed section of the switch, and the corresponding ones of these fixed contacts are connected together electrically in series. The four series illustrated terminate at the terminal connectors 440, 442, 444 and 446.

Since all of the selector switches 390, 400 and 402 and the card key switch 382 are used in the code and are to be selected in sequence, the operator adjusts the selector toggle switches 450, 452 and 454 to the "in use" position, and the sequence toggle switches 456, 458 and 460 to the "in sequence" position.

Having thus set up the desired code, which authorized personnel have been advised of, the operator then sets the fast exit switch 374 to the off position, the door alarm switch 320 and the wrong button alarm switch 470 to the on positions the button bypass switch 472 and the card key and button bypass switch 474 to the off positions, and the switch 338 to the position in which the entrance door is locked if a wrong selector button is pushed. Thereafter, the operator closes the operating panel and locks the same by means of the combination dial lock.

Assuming the person within the booth is authorized to enter the security area and has been apprised of the established code, he then proceeds to match the code by pressing, in sequence, the push buttons 480 identified by the letters K, Z and the numeral 10. These push buttons are mounted in the operating panel 72 in registry with the corresponding switch push buttons 482 mounted immediately behind them on the control panel 70.

When the person completes the first coding step, i.e. depressing the push button lettered K, an electric circuit is completed from the secondary of transformer 270 (FIG. 20), through the closed contacts 272 of the energized relay 290 and the break-soon microswitches 228 and 228′, thence through the closed contacts 368 of energized relay 332 to the terminal connectors 370, through the push button switch 482 (FIG. 21) lettered K, thence through the isolated contact 396 of the selector switch and the rotary contact 412 of the sequence switch, thence through the terminal connectors 420 and the normally closed contacts 490 of the deenergized relay 492, thence through the relay 494 to ground. Activation of relay 494 effects opening of the associated normally closed contacts 496 to prevent activation of the relay 492 by inadvertently depressing another one of the push buttons 482 lettered A–J. Activation of the relay 494 closes the normally open contacts 498 to complete a holding circuit for the relay after the push button lettered K has been released. Activation of the relay 494 also opens the normally closed contacts 500 and closes the normally open contacts 502, 504.

As the person depresses the push button lettered Z, an electric circuit is completed through it and the isolated contact 496*a* of the selector-switch, through the rotary contact 412*a* of the sequence switch at its second contact position, thence through the terminal connectors 422 and the sequence switch 456, through the closed contacts 502 of the energized relay 494 and the normally closed contacts 506 of the deenergized relay 508, thence through the relay 510 to ground. Activation of this relay effects opening of the normally closed contacts 512 to prevent activation of the relay 508 by inadvertent depressing of one of the push buttons lettered L–Y. Activation of this relay 510 closes the holding contacts 514 and opens the normally closed contacts 516 and closes the normally opened contacts 518, 520.

In similar manner, depressing of the push button 480 numbered 10 completes an electric circuit through it and the isolated contact 396*b* of the selector-switch, thence through the rotary contacts 412*b* of the sequence switch in its third position, thence through the terminal connectors 424 and the sequence switch 458, through the closed contacts 518 of the energized relay 510 and the normally closed contacts 522 of the deenergized relay 524, thence through the relay 526 to ground. Activation of this relay opens the normally closed contacts 528 to prevent activation of the relay 524 by inadvertently depressing one of the push buttons numbered 1–9. Activation of this relay 526 also closes the holding contacts 530, opens the normally closed contacts 532 and closes the normally open contacts 534, 536.

The person then slides his identification card key into the card key switch 382 (FIG. 21). This card key and switch assembly is constructed in the manner fully described in my U.S. Letters Patent No. 2,769,873. Briefly, the card key contains a plurality of magnetic elements confined between layers of paper or other non-magnetic material, the magnetic elements being arranged in a pattern which conforms to the pattern of magnets confined within the switch assembly. The magnetic elements in the card key function to attract the magnets in the switch and thus release a movable member in the latter so that the card key may be pushed further into the switch assembly to effect closure of the switch contacts 384.

Closure of the contacts 384 completes an electric circuit through the rotary contact 412*c* of the associated sequence switch in the fourth position of the latter, thence through the terminal connectors 426 and the sequence switch 460, through the closed contacts 534 of the energized relay 526 and the normally closed contacts 544 of the deenergized relay 546, thence through the relay 548 to ground. Activation of this relay 548 opens the normally closed contacts 550 to prevent activation of the relay 546 by the inadvertent depressing of one of the push buttons in a selector switch assembly which may be connected to the terminal connectors 446. Activation of this relay closes the holding contacts 552 and also closes the normally open contacts 554 to complete the series circuit including the previously closed contacts 504, 520 and 536. This completes the electric circuit of the exit door latch solenoid 170 from ground through the entrance door microswitch 124, thence through said series of closed contacts, through the normally closed contacts 380 of the deenergized relay 372, thence through the normally closed contacts 560 of the deenergized relay 314, through the fuse 274 and closed contacts 272 of the energized relay 290 to the transformer secondary. Activation of this solenoid 170 releases the latch bolt 154 and permits the exit door 24 to be pushed open for entry to the security area.

On the other hand, let it be assumed that an unauthorized party attempts to gain access to the security area, and in so doing, by mere chance properly selected the push button Z but depresses it before depressing the proper push button in the group lettered A–K. Thus, although the push button lettered Z is in the required code, it is out of sequence. Accordingly, depressing the push button 480 lettered Z completes an electric circuit through the terminal connectors 422 and the sequence switch 456, through the normally closed contacts 500 of the deenergized relay 494, thence through the normally closed contacts 512 of the deenergized relay 510 and through the relay 508 to ground. Activation of this relay closes the normally open contacts 562 to provide a holding circuit for said relay, through the break-late microswitches. Activation of the relay 508 also opens the normally closed contacts 506 to insure against activation of relay 510 by a subsequent closure of the contacts 502 which would be possible upon the chance selection of the push button lettered K to activate relay 494.

Activation of relay 508 also effects closure of the normally open contacts 564 to complete the electric circuit of the relay 314 through the break-late microswitches. Activation of this relay opens the normally closed contacts 560, thereby breaking the electric circuit of the coding assembly.

Activation of the relay 314 also closes the associated contacts 566 to complete an electric circuit from ground through the terminal connectors 568 and the wrong button relay 570 (FIG. 22), thence through the terminal connectors 362 and the closed contacts 272 to the transformer secondary. Activation of the wrong button relay 570 closes the associated contacts 572 to activate the wrong button indicator light 306. A holding circuit for the wrong button relay 570 also is completed by closure of the contacts 574 in the circuit of reset push button 576.

Activation of the relay 314 also effects opening of the associated contacts 312 to break the electric circuit of the alarm relay 310, thus closing the associated contacts 322 and activating the alarm 308.

In the event the code combination is set up without regard to sequence of steps, the toggle switches 456, 458 and 460 are moved to their alternate position to bypass the switch contacts 502, 518 and 534, respectively.

Alternatively, let it be assumed that the unauthorized party properly selects the group of push buttons A–Z as the first of the sequence, but selects the wrong push button in that group. For example, assuming the party depresses the push button lettered A, an electric circuit is completed through it and the associated fixed contact 398, thence through the engaging rotary contact 394 and the rotary contact 432 of the second sequence switch, thence through the terminal connectors 440 and the normally closed contacts 496 of the deenergized relay 494 (FIG. 20), through the relay 492 to ground. Activation of this relay closes the associated contacts 580 to complete a holding circuit for said relay, and also closes the contacts 582 to complete the electric circuit of the relay 314. As described hereinbefore, activation of this relay deactivates the coding system to render the exit door solenoid 170 inoperative, and also activates the alarm 308 and the wrong button indicator light 306. Activation of the relay 492 also opens the associated contacts 490 to prevent activation of the relay 494 by the subsequent chance selection of the proper push button lettered K.

From the foregoing it will be apparent that the circuits through the terminal connectors 440, 442, 444 and 446 and the associated relays 492, 508, 524 and 546 function upon the selection of a wrong push button or selection of the improper sequence of code, to disable the exit door solenoid and to sound an alarm or given other indication that the person within the booth has not properly completed the coding combination.

In the event it is desired to confine within the booth a person who has not completed the code combination correctly, the toggle switch 338 is moved to engage the contact 586. In this position the electric circuit of the entrance door latch solenoid 120 must be completed through the normally closed contacts 560 associated with the relay 314. Since the latter relay becomes energized when a wrong push button is selected, it will be apparent that neither of the doors can be opened when a mistake in coding has been made.

In the event it is desired to permit access to the security area simply by means of the card key, the push button assembly is bypassed by closing the toggle switch 472 to complete the electric circuit of relay 590 through the terminal connectors 592 and the card key switch contacts 384. Activation of relay 590 closes the associated contacts 594 which function to complete the electric circuit of the exit door solenoid 170 by bypassing the push button assembly.

When the card key is used alone, it may be desirable for added security to complete the foregoing circuit by a second party, such as a guard, by depressing an additional push button switch 596 arranged in series with the switch 472 and located remotely from the booth.

Alternatively, certain circumstances may dictate the desirability of permitting access to the security area without the use of either code push buttons or card key. In such event, the toggle switch 474 is closed and an authorized person within the security area inserts a proper key in an electric lock switch to close the switch 598 arranged in series with the toggle switch 474. The key lock switch 598 is located on the exit wall section 22.

As the exit door is opened slightly, for example $\frac{1}{16}$ inch, the break-soon microswitch 228' is switched to the contact 600, thereby shunting the contacts 364 to maintain the indicator lights 343, 344 energized after relay 332 becomes deenergized. Upon further opening of the exit door, for example ½ inch, the break-late microswitch 230' switches to the contact 602 to complete the electric circuit from the transformer secondary through the closed contacts 272 and said break-late switch, thence through the terminal connectors 604 and the exit door relay 606 (FIG. 22), through the connecting terminals 354 to ground. Activation of this relay closes the associated contacts 608 to complete a holding circuit through the reset button 610. Activation of the relay 606 also closes the associated contacts 612 to complete the battery circuit of the indicator lamp 304 to give visible evidence that the exit door is opened.

Upon movement of the break-late microswitch 230' from the position shown in FIG. 20, the electric circuit of relay 332 is broken, thus returning the associated switch contacts to the positions illustrated and also breaking the electric circuit of the code switch assembly.

Although closure of the contacts 330 of the deenergized relay 332 effects partial completion of the entrance door relay 324, the open position of the break-soon microswitch 228' prevents activation of the relay 324 when the entrance door handle is pulled to close the microswitch 94. Thus, entrance to the booth through the entrance door cannot be achieved while the exit door is open.

After the person has passed through the exit door to the security area and the exit door has closed, the break-soon and break-late microswitches are returned to the positions indicated in FIG. 20 and the system is again placed in readiness for a second entrance.

In the event a person now desires to exit from the security area, he pulls upon the handle 86' of the exit door 80'. The associated microswitch **94*b* thus is closed, completing the electric circuit of the relay 328 through the inactive position of the fast exit switch 374 and the normally closed contacts 334 of the deactivated relay 324, thence through the closed contacts 330 and the break-soon microswitches 228, 228' to the transformer secondary. Activation of relay 328 effects opening of the normally closed contacts 326 to break the electric circuit of the relay 324 associated with the entrance door, to insure against opening of the latter while the exit door is open. Activation of relay 328 also closes the contacts 620 to form a holding circuit for the relay by bypassing the break-soon microswitches. Activation of the relay 328 also closes the contacts 622 to complete the electric circuit of the exit door latch bolt solenoid 170 through the closed microswitch 124 of the entrance door, thence through said closed contact 622 and the closed contacts 560, thence through the fuse 266 and the closed contacts 264 of the energized relay 290 to the secondary of transformer 260. The exit door latch bolt thus is retracted to permit entrance to the booth from the exit door. After the exit door has closed, the person then may push upon the box 98 to effect opening of the entrance door 18**, as explained hereinbefore.

When it is desired to provide unobstructed exit from the security area, for example during the change of a working shift, the fast exit toggle switch 374 may be moved to engage the contacts 630, 630' to connect the relays 328 and 372, respectively, directly to the transformer secondary upon closure of the respective microswitches **94*b* and 94*a***.

As explained hereinbefore, the latch bolt mechanism for the entrance door includes an emergency release by which to open the door for escape from the booth to the unsecured area. This is achieved by breaking the emergency glass 142, the housing 144 of which projects through an opening 640 in the operating panel. For purposes of breaking the emergency glass there is provided a hammer 642, the handle of which is connected to a cord 644 wound upon a spring loaded reel 646 (FIG. 7) which serves to permit use of the hammer and yet insures against loss of the latter.

Although the release of the entrance door under emergency condition is purely mechanical, yet this mechanical operation functions to open the associated microswitch 150 in the circuit of the alarm relay 310, thus effecting actuation of the alarm 308.

Similarly, emergency exit from the security area through the exit door 24 may be effected by breaking the emergency glass 202 with the hammer 650 located on the exit wall section 22.

From the foregoing it will be apparent that the present invention provides versatile and effective means by which to achieve maximum security control with respect to a security area. The booth is portable, permitting its transfer from station to station and installation with speed and facility. Its pick proof operation renders it a point of absolute no entry for unauthorized personnel, and the vast number of code combinations accommodates frequent changing of the code combination for maximum security. The electro-mechanical construction of the booth affords a mode of operation which is completely devoid of human error.

It will be apparent to those skilled in the art that various changes may be made in the details of construction described hereinbefore without departing from the spirit of this invention and the scope of the appended claims.

I claim:

1. In combination with lock means movable between locking and unlocking positions, electrical actuator means for said lock means, and electrical operating means for the actuator means and having an electric circuit including adjustable code setting switch means and code matching switch means, the operating means being operable upon matching of the said code setting and matching switch means to complete the electric circuit, whereby to effect actuation of the lock means to unlocking position.

2. The combination of claim 1 including indicator means operatively associated with the circuit of the operating means and operable upon failure to match the set code.

3. The combination of claim 1 including means associated with the circuit of the operating means and operable upon failure to match the code to maintain the lock means in locking position.

4. The combination of claim 1 wherein the circuit of the operating means includes a plurality of code setting and code matching switch means, and combining means operatively interconnecting the code setting and code matching switch means for effecting actuation of the lock means to unlocking position upon matching of the set code.

5. The combination of claim 1 wherein the circuit of the operating means includes a plurality of code setting and code matching switch means, and adjustable sequencing switch means associated therewith for arranging them in selected sequences for matching.

6. The combination of claim 1 wherein the actuator means and operating means are electrical and each is provided with an electric circuit, and wherein the operating means includes a plurality of code setting switches operatively associated with the circuit of the operating means, the code matching means comprising a plurality of switches each associated with one of the adjustable code setting switches and operable upon matching the positions of the code setting switches to complete the electric circuit of the operating means.

7. The combination of claim 6 including a plurality of adjustable sequence switches each operatively associated with one of the adjustable code setting and code matching switches for arranging the latter in selected sequences of matching.

8. The combination of claim 7 including a plurality of adjustable wrong selection switches each operatively associated with one of the code setting, matching and sequence switches and operatively associated with the electric circuit of the operating means to prevent actuation of the lock means to unlocking position upon failure to match the set code.

9. In combination with a pair of lock means each movable between locking and unlocking positions, electrical actuator means for each lock means, and each having an electric circuit, operating means in the circuit of each actuator means, and switch means in each circuit and each operatively associated with the operating means for the opposite lock actuator and arranged to maintain one of said door lock means in locking position when the other of said door lock means is in unlocking position, the operating means for one of said lock means including code setting and code matching means, said operating means being operable upon matching of the set code to effect actuation of the associated lock means to unlocking position.

10. The combination of claim 9 including means associated with the circuit of the operating means for each lock means and operable upon failure to match the set code to maintain both lock means in locking position.

11. The combination of claim 9 including means responsive to the weight of a person to maintain both lock means in locking position prior to completion of matching the set code.

12. A door latch comprising a latch bolt movable between locking and unlocking positions, an electric solenoid for moving the latch bolt, an operating shaft, means on the operating shaft interconnecting the latch bolt and solenoid, an emergency release shaft movable between a cocked position and an emergency release position, means interengaging the operating shaft and release shaft for moving the operating shaft by the release shaft during movement of the latter to emergency release position, whereby to move the latch bolt to unlocking position, resilient means normally urging the release shaft toward release position, and releasable retainer means normally securing the release shaft in cocked position and operable upon release to permit movement of the release shaft to release position and unlock the latch bolt.

13. The door latch of claim 12 wherein the releasable retainer means comprises a breakable glass.

14. The door latch of claim 12 wherein the operating shaft is rotatable, the release shaft is movable longitudinally in a direction substantially normal to the axis of the operating shaft, and the interengaging means comprises an abutment on the release shaft arranged during its longitudinal movement toward release position to engage an abutment on the operating shaft and to rotate the latter to unlock the latch bolt.

15. The door latch of claim 12 wherein the operating shaft is rotatable, the release shaft is movable longitudinally and rotationally, substantially coaxial with the operating shaft, and the interengaging means comprises an abutment on the release shaft arranged during its longitudinal and rotational movement toward release position to engage an abutment on the operating shaft and to rotate the latter to unlock the latch bolt.

16. The door latch of claim 12 including electric switch means operable by the emergency release shaft upon movement of the latter to release position and adapted to be arranged in the circuit of an electric indicator to evidence the emergency unlocking of the latch bolt.

17. The door latch of claim 12 including electric switch means operable by movement of the operating shaft to latch bolt unlocking position and adapted to be arranged in the circuit of the solenoid of a second door latch to maintain the latter in locking position while the first named latch bolt is in unlocking position.

References Cited in the file of this patent

UNITED STATES PATENTS

| | | |
|---|---|---|
| 1,449,248 | Rathbun | Mar. 20, 1923 |
| 1,635,028 | Burr et al. | July 5, 1927 |
| 1,778,294 | Kennedy | Oct. 14, 1930 |
| 1,819,410 | Finkenbinder | Aug. 18, 1931 |
| 1,948,217 | Goodwin | Feb. 20, 1934 |
| 2,079,824 | Smeaton et al. | May 11, 1937 |
| 2,561,076 | Tassin | July 17, 1951 |
| 2,830,838 | Drager | Apr. 15, 1958 |